United States Patent [19]

Bustini et al.

[11] Patent Number: 4,918,687
[45] Date of Patent: Apr. 17, 1990

[54] DIGITAL PACKET SWITCHING NETWORKS

[75] Inventors: Lionel Bustini, Nice; Andre Cretegny, Le Pecq; Gerard Marmigere, Drap; Guy Platel, Villeneuve Loubet; Pierre Secondo, Saint Jeannet, all of France

[73] Assignee: International Business Machines Corporation, Armonk, N.Y.

[21] Appl. No.: 247,025

[22] Filed: Sep. 20, 1988

[30] Foreign Application Priority Data

Sep. 23, 1987 [EP] European Pat. Off. ........ 87480011.3

[51] Int. Cl.⁴ .............................................. H04J 3/26
[52] U.S. Cl. ...................................... 370/60.1; 370/61
[58] Field of Search ...................... 370/60, 61, 79, 94, 370/60.1, 94.1, 94.2

[56] References Cited

U.S. PATENT DOCUMENTS 4,769,811 9/1988 Eckberg, Jr. et al. ................ 370/60

FOREIGN PATENT DOCUMENTS 0171596 2/1986 European Pat. Off. .
0237211 9/1987 European Pat. Off. .

OTHER PUBLICATIONS

S. W. Friedman et al., "Traffic Control in Packet Switched Networks", IBM Technical Disclosure Bulletin, vol. 18, No. 7, Dec. 1975, p. 2110.

Primary Examiner—Douglas W. Olms
Assistant Examiner—Melvin Marcelo
Attorney, Agent, or Firm—Joscelyn G. Cockburn

[57] ABSTRACT

In a packet switching network, voice packets are made to include an EC field whose contents indicates whether the corresponding packet is eligible for clipping if required in a node queue within the network. Should clipping of a non eligible packet be required, then another bit field would be set in the following packet on same link to limit any possible clipping of successive packets on same link.

12 Claims, 9 Drawing Sheets

DIGITAL PACKET SWITCHING NETWORKS

FIELD OF INVENTION

This invention deals with a method and means for optimizing the traffic in a Packet Switching Network.

BACKGROUND ART

Digital transmission systems are known wherein real time signals (e.g voice) are transmitted in packet form. An advantage of packet switching derives from it enabling easily mixing real time and data. However the protocols are completely different. Since for real time signals end-to-end delays are constrained and real time is required for packets restitution, then erroneous packets, and packets which have been too much delayed waiting in network node's queues must be discarded and cannot be retransmitted. This results in packet losses. While data packets may be delayed and retransmitted if required.

In the following description, real time signal will be considered as relating to voice signal, but the invention applies to other real time signals, to video images for instance.

One has today efficient methods to reconstruct, at the receiving end, some of the lost voice packets (see European Applications 0,139,803 and 0,162,173 to the same applicant) which generate no audible degradation up to a loss of 5%, keep intelligibility and speaker recognition ability up to a loss of 33% with a graceful degradation of the speech quality. But unfortunately, these methods are not efficient as far as voice quality is concerned if two packets or more are consecutively lost for a given speaker.

One object of this invention is to provide an efficient and simple method to drastically decrease consecutive voice packets losses, in a digital network.

Another object is to provide means for freeing bandwidth for data traffic in a voice packet network.

DESCRIPTION OF A PREFERRED EMBODIMENT

Figure 1:
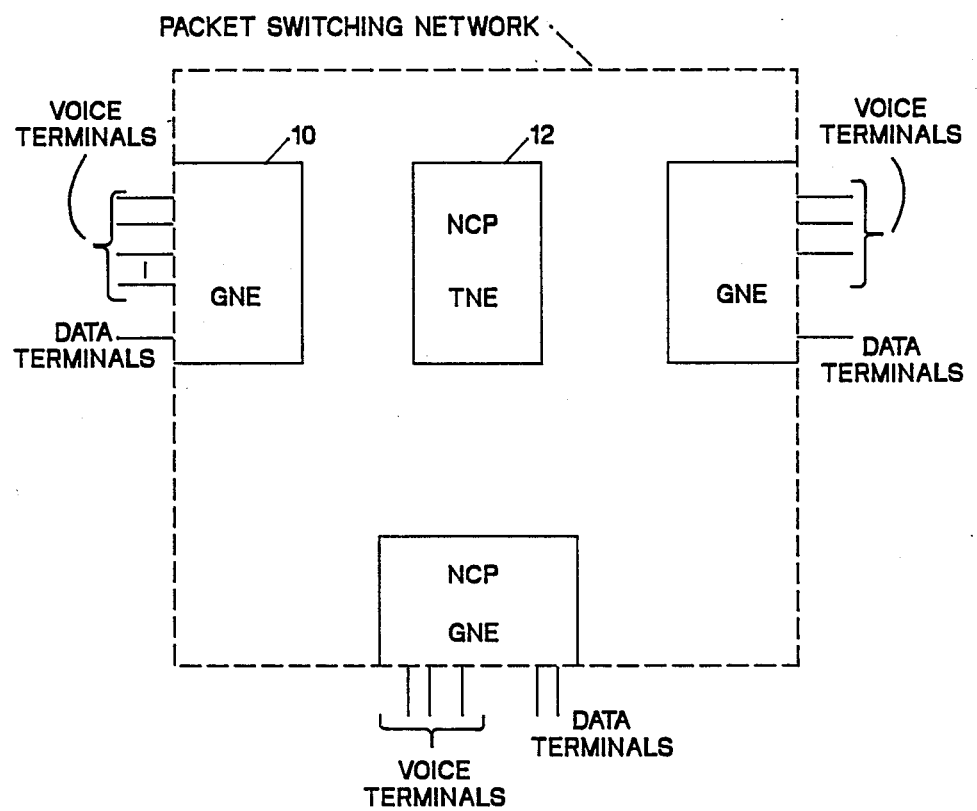
FIG. 1 represents a block diagram of a packet switching network.

FIG. 1 represents a block diagram of a digital packet switching network to which both voice and data terminals (not shown) may be attached. Also, not represented are means for converting the analog voice signals into digital data packets. The packets i.e. pure data provided by data terminals, or voice data provided by voice terminals and digitally encoded enter the network through a Gate Node Equipments (GNE) 10, and may have to transit through one or several Transit Node Equipment (TNE) 12. A more detailed description of the operation of such a network (operating on voice data) was given in European Application 0,162,173. What needs be understood for the present invention is that each node is a complex digital information handling and processing system including for instance Communication Controllers. The node is conventionally controlled by a Network Control Program (NCP) or NCP like program. In each node, data are recollected from the incoming channels and packet frames reconstructed. These packets are to be then routed properly by NCP toward their final destination. In general a buffering operation, i.e. queuing, is operated in between, within each node.

Figure 2:
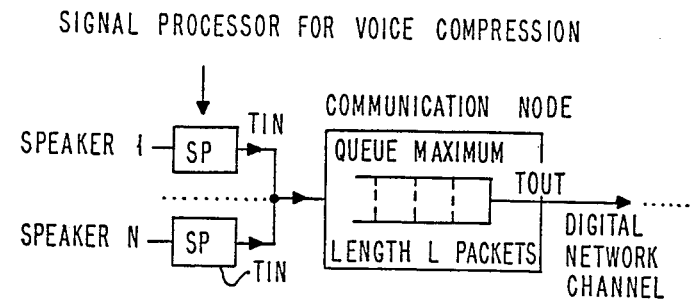
FIGS. 2, 3 and 4 show node traffic and queuing operations.

FIG. 2 represents a particular node concentrating N speakers over a digital Network channel. On each input voice unit or speaker attached through a telephone line, digitization and compression of the speech signal are operated. Several means are known for performing this function. For instance one may use the coder described in the IBM Journal of Research and Development Vol 29, Number 2, March 1985 by C. Galand et al implemented in a program controlled signal processor (SP) 20. During silences no packet is produced. During active period of speech, the output of each signal processor SP consists in a voice packet which is transmitted to the communication node. The voice packets are generated with a constant period tin (usually in the range, 5 to 40 ms; in the following description 40 ms is assumed). The queuing system provides packets to the channel with a constant service time Tout. So the simultaneous speakers channel capacity is:

$$SSC = Tin/Tout$$

SSC is proportional to the voice compression ratio and the digital channel bit rate.

To perform proper voice transmission over the network the end to end delay on voice packet transfer should not exceed a predetermined value. In order to limit each node delay, the queue length is limited to L, and the oldest packet is discarded when the actual queue length, reaches L. This is what is termed as clipping operation to be further improved in this invention.

The communication nodes may include Communication Controllers IBM 3725 and the system may operate as disclosed in European Application 0,162,173.

Figure 3:
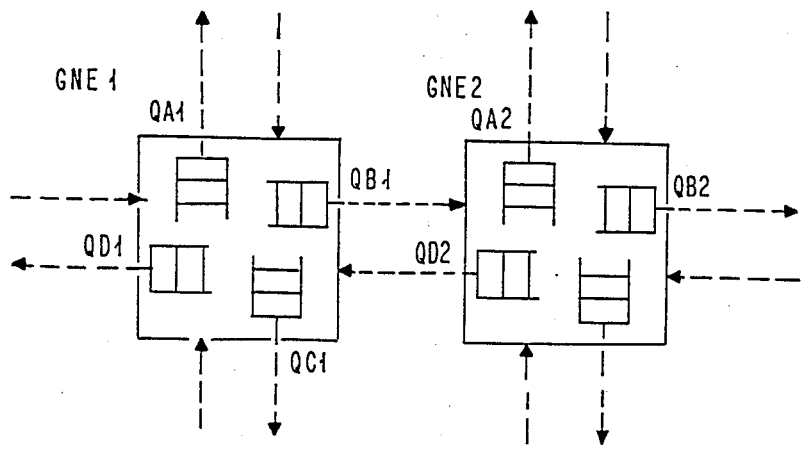

The node controllers may be connected through 4 full-duplex lines. There is one packet queue for each exit line (QA, QB, QC, QD) (see FIG. 3).

During its transmission, a voice packet travels through several packet switching nodes, where it is randomly delayed due to the queueing process. As a result, there is a jitter on the transmission delay.

Figure 4:
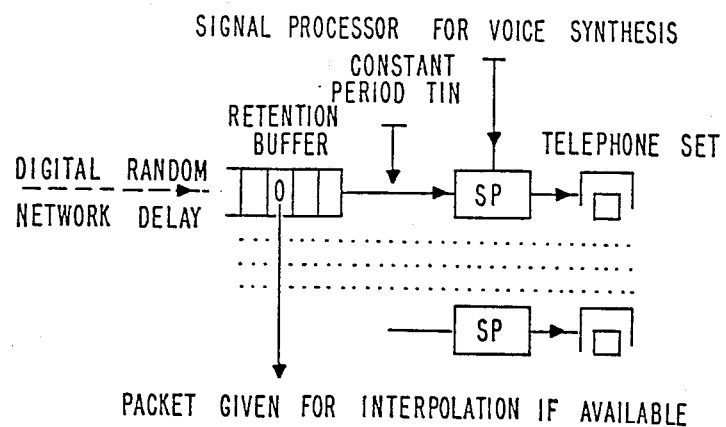

In order to ensure a constant period Tin for the packet synthesis, the packets are enqueued at the reception node in a retention buffer (FIG. 4). (For more details on the packets synchronizing system, one may refer to European Application 0,162,173). As a result, the total queueing end to end delay is constant and equal to K.L. Tout, with K being the number of nodes. This delay is therefore proportional to L.

Due to the inherent nature of speech signals which comprise successive talkspurts and silences, it is possible to interleave several speech communications on a reduced bandwidth. This principle has been widely used in Time Assignment Speech Interpolation systems (TASI), operating on analog signals and in Digital Speech Interpolation systems (DSI) operating on digitized voice. One may derive the DSI gain on voice packets by modeling the talkspurt/silence distribution of each speaker by a simple two states Markov model. The silences and talkspurts durations are exponentially distributed with mean values Ts and Tt. One may then derive the model for N independent speakers, which is a continuous time Markov chain whose state n is the number of simultaneous active speakers.

This is actually a birth and death process. Whose stationary probability to be in state "n active speakers" is:

$$P_n = C_N^n \times (Tt/(Tt+Ts))^n \times (Ts/(Tt+Ts))^{(N-n)}$$

If n>SSC (underload) the queue length is decreasing.

The packet loss probability for a small length (in this case the overload results in immediate tail clipping), and for a transmitter node, is easily derived:

$$\text{Loss} = \text{SUM}(n > \text{SSC}) [P_n \cdot ((n-\text{SSC})/n)]$$

Typical values show that for loss probabilities around a few % (e.g 5%), the gain on the number of speakers compared to SSC is ((Tt+Ts)/Tt). The actual voice activity (Tt/(Tt+ts)) much depends on the way the voice activity detection is performed in the sending signal processor. Voice activity usually ranges from 40 to 50%.

So with a loss of a few % (e.g. 5%) one can double the number of speakers or triple it with loss of about 30%. And therefore, the queue clipping associated with an efficient packet reconstruction algorithm (to reconstruct the clipped or lost packets at the receiving end) through interpolation/extrapolation operations as disclosed in EPO Application 0,139,803 drastically improves DSI efficiency.

It is obvious that for important losses (30%), if the queue clipping is performed randomly, one will obtain an important proportion of consecutive losses on each speaker.

Since lost voice packets are reconstructed by interpolation/extrapolation based on neighboring packets, consecutive packets lossed are obviously to be avoided.

It may be shown that even for small clipping rates (1%) it exists cyclic states that drive to important consecutive losses on given speakers (27% of the lost packets).

A clipping strategy is proposed here to avoid consecutive clipping on a same speaker, and use a controlled clipping process to free channel bandwidth for optimizing the traffic. By optimizing one means here increase the number of voice terminals processed or integrate data and voice over the same channel. For that purpose the packets have been given a specific structure in format.

Figure 5:
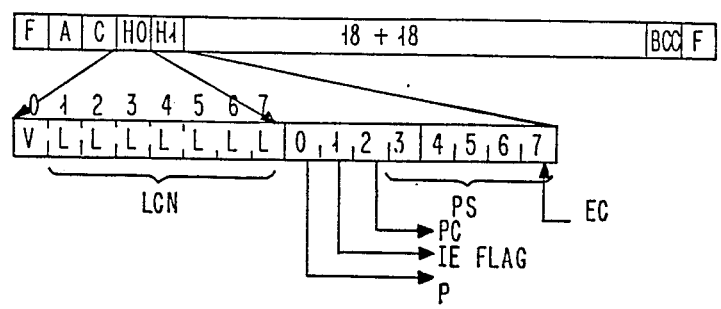
FIG. 5 represents a data packet structure.

FIG. 5 illustrates the format of a packet of bits as generated at the transmitting end of the network. Fields F, A, C, BCC and F are as defined in HDLC/SDLC (for further details, reference should be made to ISO Standard IS 3309). The F fields contain 8-bit flag bytes of the type "01111110" ("7E" in hexadecimal notation). The second field A, contains a byte specifying the address of the terminal at the transmitting end. The third field, C, contains a byte that controls the direction in which the transmission is to be effected. Field BCC consists of two characters (bytes) used for transmission checking purposes.

The packet further contains two header bytes H0 and H1. Byte H0 is used to define the nature (voice or data) of the packet and to guide the propagation of the packet through the network, between input and output terminals. The contents of H0 includes a logic channel number (LCN) defining a channel between a GNE and an immediately following TNE or between two consecutive TNEs or GNEs in the transmission path between two terminals. Thus, H0 needs to be updated in each node using a technique similar to that described in CCITT Recommendation X.25. The second byte, H1, is more important from the standpoint of the present invention. The eight bit positions of H1 are numbered 0 to 7. Bit zero, designated P is termed parity flag. Bit 1 (designated IE/flag) is an interpolation/extrapolation flag. Bit 2, designated PC, is a bit to be used as Prevent Clipping bit as explained further. Note that, for present purposes, the IE flag bit is set to the "0" logic level to indicate the end or the beginning of a talkspurt. Bits 3 to 7, designated PS define each packet sequence number. This field is loaded by a modulo 32×40 ms counter to count the elapsed time.

The data bits form two groups of eighteen bytes each, representing a total of two 20 ms long segments of voice signal.

The parity bit P alternates between the "1" and "0" logic levels to indicate a long pause, and remains unchanged in the case of a short pause (<1.28 s).

The contents of field PS is forced to zero at the end of a long pause, that is, when bit P value changes, and is then incremented by one every 40 ms, regardless of whether a packet is transmitted or not. For present purposes, field PS has been limited to five bits, which allows a modulo-32 counting function (32 being expressed in decimal). Although this field length is not limitative, it is considered sufficient to enable a precise measurement of short pauses since 32×40 ms=1.28 s.

The lowest order bit of the PS field is designated "EC" (Eligible for Clipping). Packets having the "EC" bit on 1 can be considered for discarding for the purpose of this invention by any network node, packets having the "EC" bit on 0 may not be considered for discarding. Setting the "EC" bit alternatively 1 and 0 in the packets of a communication ensures therefore that two consecutive packets may not be discarded (although two consecutive packets still may be lost in case of line errors). This is why no extra bit is required for the EC function by using the lowest order packet sequence number bit. The frequency of eligibility for clipping may change according to the voice quality expected. For instance if only one packet out of ten is eligible for clipping then the clipping rate will not be higher than 10% even in case of peak activity. This leads to the concept of "class of service" for the communications. In this case, the EC field would be extended accordingly.

The efficiency of this mechanism is independent of the network topology, it is 100% if the clipping threshold is equal or greater to the number of communications. But in case of complex network, to guarantee minimum end to end delay the queue threshold must be sized to a value less than the maximum number of communication (typically half of this number). In such case the queue may contain only non eligible for clipping packets, which leads to consider discarding non eligible for clipping packets. The described way of assigning the EC bit of a packet ensures however a low probability of the phenomena occurrence.

Nevertheless this may be improved using the following additional feature:

The bit "PC" (Prevent Clipping) indicates that the previous packet for this communication was discarded in one of the previous nodes. The first clipping mechanism may be enhanced by checking this "PC" bit before discarding a packet. Transmission priority is given to packets having the "PC" bit ON to avoid consecutive clipping in the cases where eligible for clipping packets must be discarded.

As explained above, the voice packets in each node are queued in a link output queue before being transmitted. This operation is performed by a "PACKET ROUTER" function (not shown) in each node. The PACKET ROUTER includes a "QUEUE CLIPPING" sub-function that continuously monitors the length of the output queues in order to perform the clipping operation, consisting in discarding the packets that have been waiting too long in a queue, whenever an incoming packet would overload the queue.

The proposed method consists in enhancing the queueing and clipping algorithms using the following additional information:

In each voice packet, the ELIGIBLE for CLIPPING bit (EC bit) is set by the originating terminating equipment. For any communication this EC bit is set alternatively to "0" and "1" (at least in a talkspurt), i.e. any two consecutive packets for a given communication will have a different EC bit. The EC bit will be the less significant bit of the Packet Sequence Counter. This counter is set to 0 after each long silence, that guarantees clipping prevention on the first packet of a talkspurt and a random scrambling over all communications.

Associate to each Voice Link Output Queue in each node, an "over-threshold" counter (OT counter) (not shown) initialized to 0. In the following description "OT" will be used to designate both the counter and its content.

Figure 6:
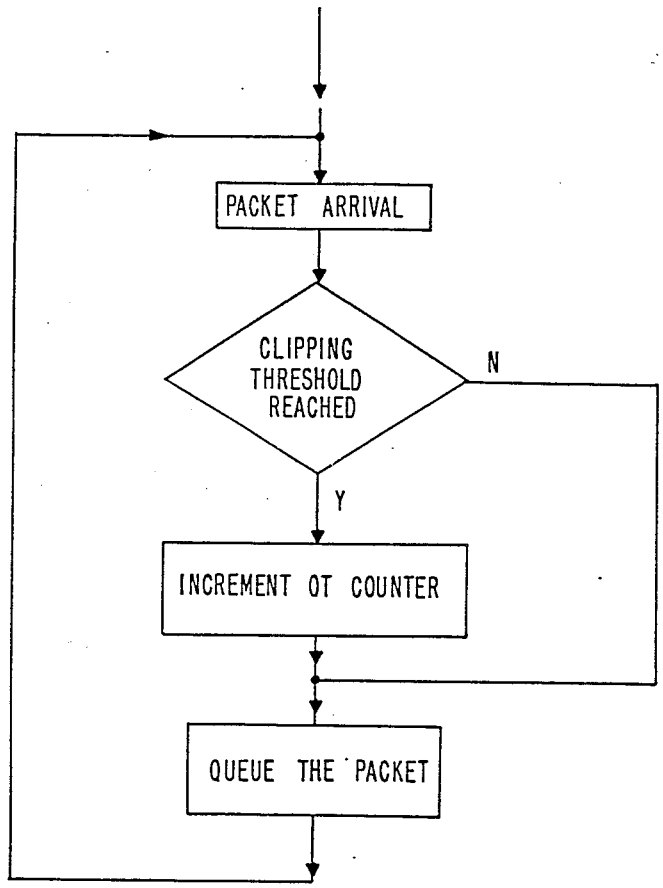
FIGS. 6, 7, 9, 10 and 11 are flowcharts of the invention.
Figure 7:
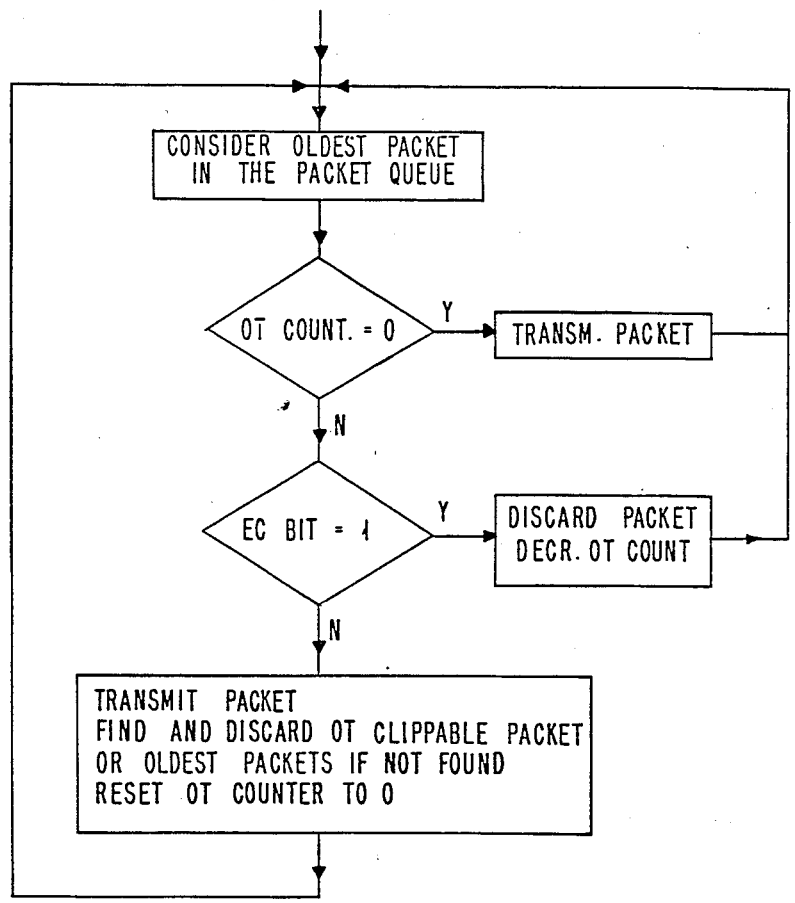

Queueing and transmitting are then performed as described below:

Before queuing a packet check the queue length: (FIG. 6).
  Queue length is lower than threshold: queue the packet
  Queue length is greater than or equal to threshold: queue the packet and increment OT counter
Before transmitting a packet check OT counter: (FIG. 7).
  OT counter equal to 0: transmit the packet
  OT counter greater than or equal to 1: check packet EC bit
    EC bit is "1": discard the packet, decrement OT counter and consider next packet for transmission
    EC bit is "0": transmit the packet and look in the queue for packets having EC bit "1" (i.e. clippable packets) and discard them (if any) until OT counter is 0 or end of link Output Queue reached, in the last case, the OT oldest packets are discarded and OT counter is set to 0.

As explained above, the number of packets waiting in a link output queue before being transmitted, can exceed the clipping threshold value, this may result in underrun in the Voice Terminal Equipment. As underrun can affect two consecutive packets of the same communication one needs to improve the first solution as follows.

Figure 8:
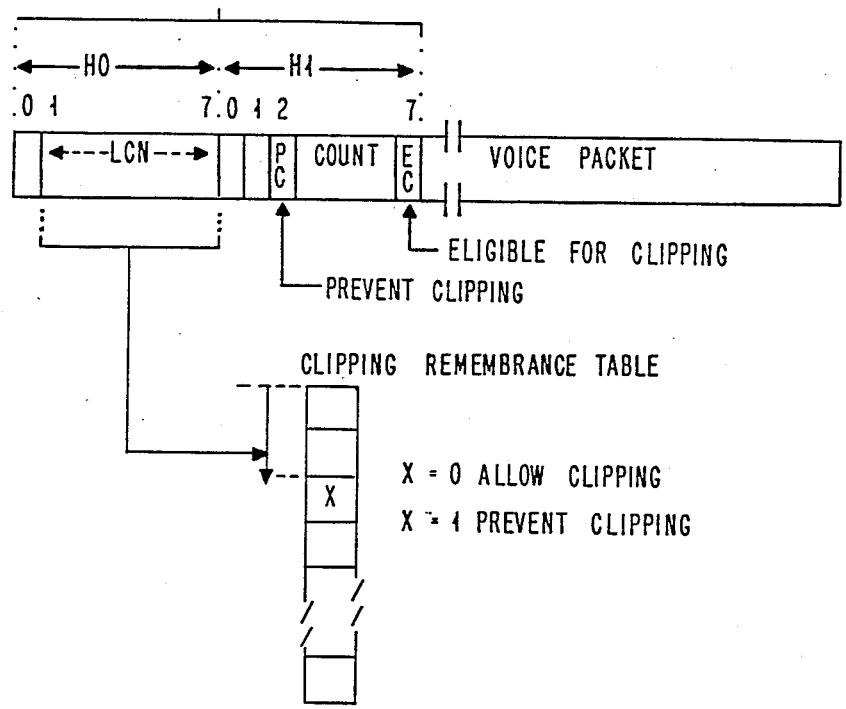
FIG. 8 shows a device for the invention.

For each voice link Output Queue, a clipping remembrance table having one flag the "CLIPPING REMEMBRANCE" flag is maintained per active Virtual Circuit i.e. designated by the corresponding LCN to be used as address for said Table (see FIG. 8). This flag is originally set to "OFF" i.e to zero.

Figure 9:
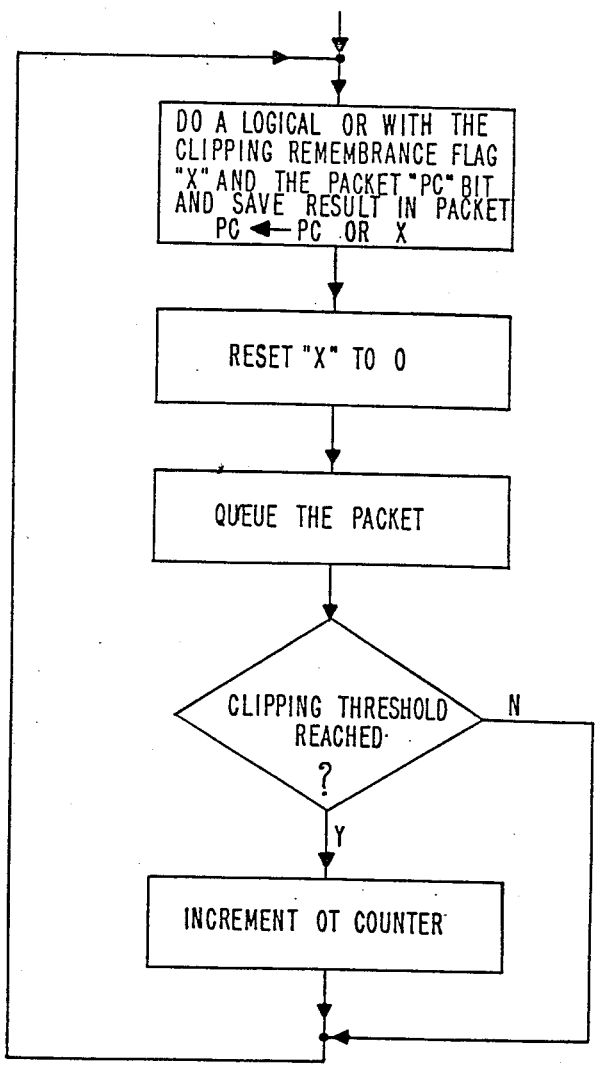

The queuing and transmission algorithms become then: (see FIG. 9).

Figure 10:
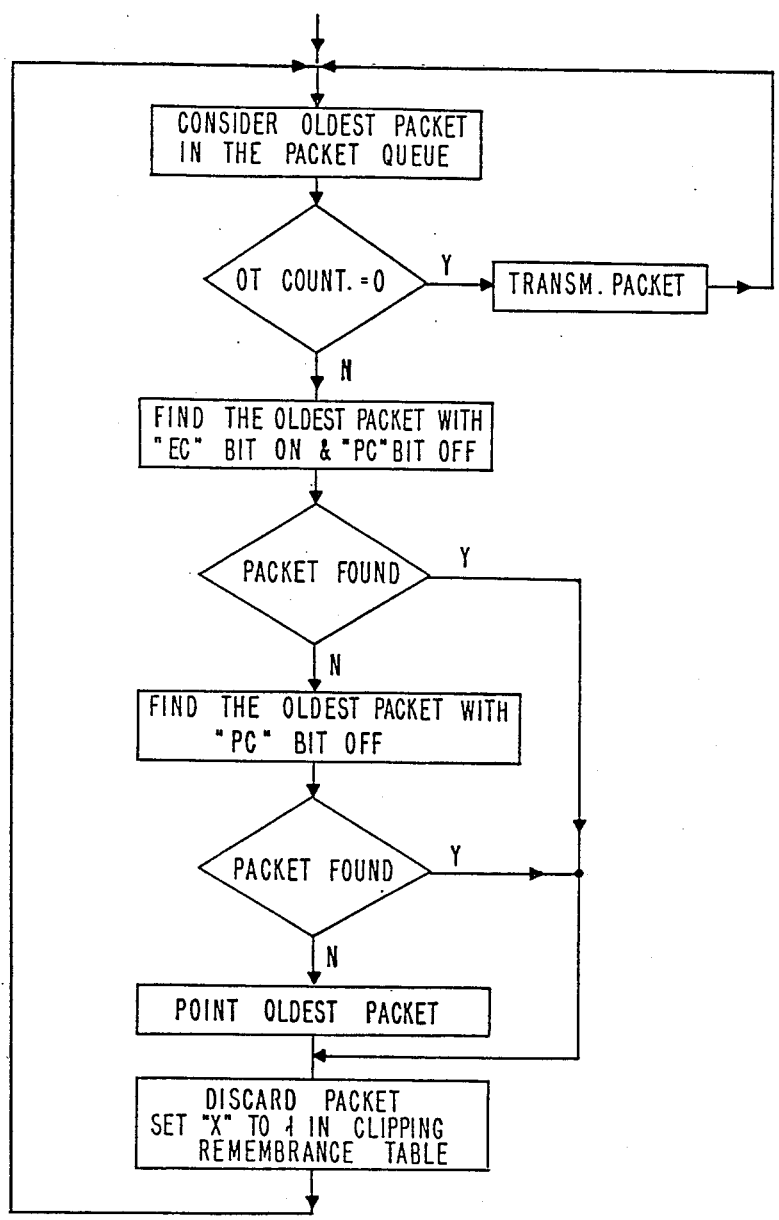

Look in the clipping table to see if the previous packet of this conversation was clipped (CLIPPING REMEMBRANCE Flag):
  If yes set the "CLIPPING PREVENTION" flag (PC bit) in the packet header (H1), to avoid possible clipping of this packet by the current or a subsequent network node.
Queuing the packet:
  If queue length is greater than or equal to threshold, increment OT counter.
Before transmitting a packet check OT counter: (see FIG. 10).
  OT counter equal to 0: transmit the packet
  OT counter greater than or equal to 1: check packet EC and PC bit
    EC bit is "1" and PC bit is "0": discard the packet and set the "CLIPPING REMEMBRANCE" flag in the corresponding entry of the table, decrement OT counter and consider next packet for transmission.
    In other case: transmit the packet and look in the queue for packets having EC bit "1" and PC bit "0" (i.e. clippable packets) and discard them (if any) until OT counter is 0 or end of Link Output Queue reached, in the last case a second look up of the queue will be performed for packets having PC bit "0".

Every time one packet of a Virtual Circuit is clipped, the "CLIPPING REMEMBRANCE" flag is set in the corresponding entry of the table.

Every time a packet is enqueued, the "PREVENT CLIPPING" bit is set if the "CLIPPING REMEMBRANCE" flag is on and the "CLIPPING REMEMBRANCE" flag is reset to zero.

The above described algorithm may be applied to a point-to-point system where two voice multiplexers are connected to each other through an aggregate link.

This configuration is a special case of the general meshed network of FIG. 1. In this point to point case the algorithm never fails, i.e. consecutive clipping is totally avoided provided that the number of communications does not exceed twice the link capacity.

By implementing the system described above, the global performance of the network in term of number of simultaneous established conversations for a given voice quality can be drastically improved, improving in the same way the economic aspect of the system.

But what is also of particular interest is that the proposed method and system for optimizing the voice traffic capacity of the network, also suits particularly to voice and data multiplexing. In this case, the selective clipping mechanism is used to lower the voice traffic more than normally required by real time operating voice traffic conditions. A portion of the bandwidth is then artificially freed for data traffic.

The number of voice packets which can be transmitted in 40 ms depends on the node to node channel capacity (link speed). The following figures apply assuming a 7.2 kbps voice compression rate:

| Link speed | max load in 40 ms |
| --- | --- |
| 48 kbps | 5 packets |
| 56 kbps | 6 packets |
| 64 kbps | 7 packets |
| 72 kbps | 8 packets |

These figures show that a 48 kbps link can transmit only 5 packets in 40 ms time, which implies that for more than five active Voice terminals attached to the corresponding node, clipping may already by necessary. It would be achieved according to this invention.

For eight Voice terminals being served, simulations gave the following results:

| link speed | max. load | average clipping rate |
|---|---|---|
| 48 kbps | 5 | 5% |
| 56 kbps | 6 | 1% |
| 64 kbps | 7 | <1% |
| 72 kbps | 8 | 0% |

This invention enables forcing the allocation of some link bandwidth to data traffic even in case of apparent saturation of the link by voice traffic.

For instance, assuming eight voice terminals are attached to a node feeding a 72 kbps link, the system would in theory by saturated with no clipping normally required. But thanks to this invention, one could limit the bandwidth devoted to voice traffic to 64, 56 or 48 kbps and assign the remaining bandwidth (i.e. 8, 16 or 24 kbps) to data traffic. The data bandwidth is then defined based on the preselected voice thruput threshold.

In operation, each node of the packet switching network includes separate queuing buffer facilities for voice and for data. The value of header H0 bit zero controls a queue switching means to orient a received packet toward a voice queue or a data queue. In fact several queues might be used for both voice and data, for different priority levels on each kind of traffic.

On the transmitting side of the node, the operations are performed as follows. The system checks first whether data queue is empty or not. Should the answer be positive, then Voice packets (if any) would be transmitted. Otherwise Voice queue is checked. Should it be empty, then data is transmitted. Under normal operating conditions, the traffic from data terminals occurs in burst mode with data frames ranging up to 288 bytes for instance. The data frame may therefore need being split into blocks to be reassembled in the receiving node.

Should Voice queue not be empty when checked, then, the Voice thruput (permanently being monitored at the Voice queue level) would be checked for duration of highest Voice packet length (i.e. 40 ms). If this thruput is higher or equal to the link threshold corresponding to the bandwidth (e.g. 48 kbps) assigned to Voice traffic, then a data packet may be transmitted. Otherwise keep sending one Voice packet and go back to initial step starting with checking data queue.

Figure 11:
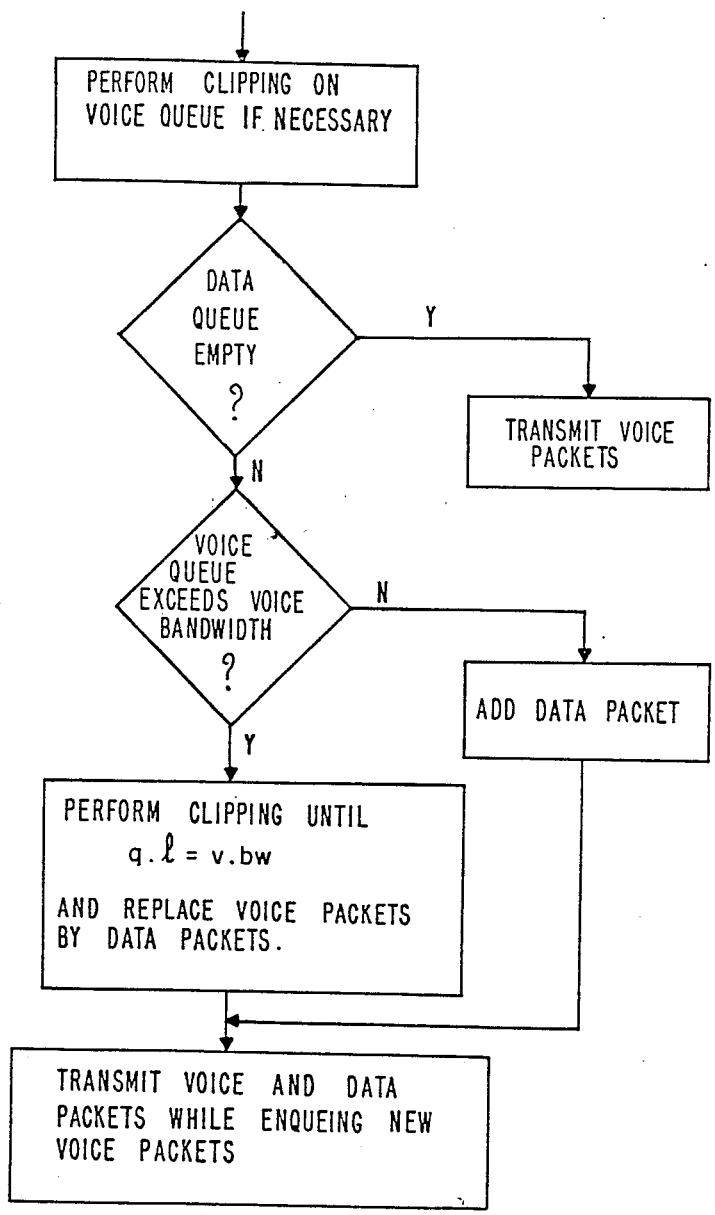

In the special case of a point-to-point network the voice thruput may be determined by delaying voice packets in the transmitting node by the system basic time period T (i.e 40 ms). Every T ms the queue is checked: the number of waiting voice packets corresponds to a voice thruput. Limiting the voice bandwidth is therefore equivalent to limit the number of queued voice packets that will be transmitted, which frees a minimum bandwidth for the data. This can be achieved in the following way (FIG. 11):

First check the voice packets queue and perform clipping if necessary so that the remaining packets may all be transmitted in T ms. The data queue is then checked. Should it be empty then transmit all voice packets. Otherwise check again the voice queue. Should the queue length be greater than the allowed (specified) voice bandwidth operate the clipping mechanism again so that the voice queue length be equal to the threshold and replace the discarded voice packets by data packets. Should the queue length be less than or equal to the allowed voice bandwidth then insert data packets up to the maximum value (line capacity). In both cases voice and data packets are transmitted while new voice packets are enqueued.

We claim:

1. A process for improving the traffic between real time terminals through a digital packet switching network including nodes wherein incoming packets are enqueued prior to being forwarded toward their destination, with clipping operations being performed within said nodes by selectively discarding enqueued packets, said process being characterized in that said packets include a so-called EC field set to a value that alternates between consecutive communicated packets to ensure that said consecutive communicated packets are not eligible for clipping within the network.

2. A process according to claim 1 wherein the packets from a source terminal are made eligible for clipping on a periodic basis.

3. A process according to claim 2 wherein said sequence is made to designate as eligible for clipping every other packet from a source.

4. A process for improving the traffic between real time terminals through a digital packet switching network including nodes wherein incoming packets are enqueued prior to being forwarded toward their destination, with clipping operations being performed within said nodes by selectively discarding enqueued packets, said process being characterized in that said packets include a so-called EC field initially loaded to indicate whether the corresponding packet is eligible for clipping or not and a bit position (PC) to be used to bar the clipping of corresponding packet.

5. A process according to claim 4 wherein, if required within a network node, a non eligible for clipping packet may be clipped, with the prevent clipping bit of next packet from same source being set during its transfer through said node, whereby said next packet is prevented from any subsequent clipping along its path within the network.

6. A process according to claim 5 wherein said real time terminals are voice terminals.

7. A process according to claim 6 further characterized in that data terminals are also attached to said network and said selective clipping operations are performed on voice packets to free a predetermined portion of the available transmission bandwidth for data traffic to flow within the network.

8. A digital transmission network with voice terminals attached therein, said terminals providing packets of bits to be transferred through network nodes queues having a predetermined threshold length, each packet including an eligible for clipping (EC) bit field, and said network nodes including:
an OT counter initially set to zero;
a queuing system checking the queue length with respect to said threshold;
means for enqueuing a node received packet and incrementing said OT counter if said checked queue length is beyond said threshold;
enqueued packet transmitting means including means for checking OT contents and for transmitting a packet if OT is empty, and otherwise checking EC bit and either discard the packet and decrement OT if EC=1 or, if EC=0, transmit the packet, search for enqueued packet with EC=1 and discard these until OT=0.

9. A digital transmission network according to claim 8 and further including means for forcing the clipping of a queue including only non-eligible for clipping packets (EC=0), and means for subsequently setting a predetermined bit position PC to 1, whereby clipping of a packet would be barred in any other node along its path.

10. A digital transmission network according to claim 9 wherein said means for setting PC=1 includes a table having a one bit position per transmission path.

11. A process according to claim 4 wherein the packets from a source terminal are made eligible for clipping on a periodic basis.

12. A process according to claim 4 wherein said sequence is made to designate as eligible for clipping every other packet from a source.

* * * * *